United States Patent
Nazarov

(10) Patent No.: US 8,560,661 B2
(45) Date of Patent: Oct. 15, 2013

(54) SYSTEM AND METHODS FOR LAUNCHING ANTIVIRUS APPLICATION TASKS DURING COMPUTER DOWNTIME

(75) Inventor: Denis A. Nazarov, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 405 days.

(21) Appl. No.: 13/026,494

(22) Filed: Feb. 14, 2011

(65) Prior Publication Data

US 2012/0174226 A1    Jul. 5, 2012

(30) Foreign Application Priority Data

Dec. 30, 2010  (RU) ................................ 2010154524

(51) Int. Cl.
*G06F 15/173* (2006.01)
(52) U.S. Cl.
USPC ............... 709/223; 709/203; 713/152; 726/1; 726/2; 726/33
(58) Field of Classification Search
USPC ........ 709/203, 223, 224; 726/1, 2, 14, 24, 25, 726/26, 33; 713/152, 164, 166
See application file for complete search history.

(56) References Cited

U.S. PATENT DOCUMENTS

| | | | |
|---|---|---|---|
| 6,065,138 A | 5/2000 | Gould | |
| 6,111,517 A | 8/2000 | Atick et al. | |
| 6,282,655 B1 | 8/2001 | Given | |
| 6,360,336 B1 | 3/2002 | Christensen et al. | |
| 6,367,020 B1 | 4/2002 | Klein | |
| 6,650,322 B2 | 11/2003 | Dai et al. | |
| 7,152,172 B2 | 12/2006 | Tsirkel et al. | |
| 2003/0187711 A1 * | 10/2003 | Komai | 705/8 |
| 2007/0130323 A1 | 6/2007 | Landsman et al. | |
| 2007/0300312 A1 | 12/2007 | Chitsaz et al. | |
| 2009/0320029 A1 | 12/2009 | Kottomtharayil | |
| 2010/0083188 A1 | 4/2010 | Pance et al. | |

FOREIGN PATENT DOCUMENTS

GB    2366866    3/2002

OTHER PUBLICATIONS

European Search Report In EP 11181538, Apr. 10, 2012, 4 pages.

* cited by examiner

*Primary Examiner* — Frantz Jean
(74) *Attorney, Agent, or Firm* — Arent Fox LLP; Michael Fainberg

(57) ABSTRACT

Disclosed are systems, methods and computer program products that enable deployment of an antivirus application on a computer system in a manner that reduce interference of the antivirus application with activities of system users. In particular, the computers system is provided with a plurality of detection devices that may be used to detect when the computers system is being used by the user or when it is in downtime mode. The detection devices may include data input device, such as a mouse or keyboard, temperature sensors, pressure sensors, digital camera, sound wave source and sound wave receiver or other detection devices. The computer system also includes a software agent associated with an antivirus application. The software agent collects and analyses data from the detection devices, determines when the computer system is in a downtime mode, and then launches various antivirus application tasks.

20 Claims, 4 Drawing Sheets

SYSTEM AND METHODS FOR LAUNCHING ANTIVIRUS APPLICATION TASKS DURING COMPUTER DOWNTIME

CROSS-REFERENCE TO RELATED APPLICATIONS

This application claims benefit of priority under 35 U.S.C. 119(a)-(d) to a Russian patent application no. 2010154524 filed on Dec. 30, 2010, which is incorporated by reference herein.

TECHNICAL FIELD

The present disclosure relates generally to the field of computer science and, in particular, to systems, methods and computer program products for launching application tasks during computer downtime.

BACKGROUND

Modern computer applications are generally resource intensive. Antivirus applications are even more so because they interact extensively with many hardware and software components of computer systems on which they run during complex system scans and other operations. Despite the fact that developers constantly improve operation of antivirus programs and their interaction with computer systems, the demand for system resources by antivirus programs continues to grow steadily, due to the increasing complexity and proliferation of computer malware, such as viruses, worms, spyware and other types of malicious software. The increased utilization of system resource, such as hard disk drive, random access memory, processor time, network bandwidth etc., by antivirus applications may interfere with user's activities on the computer system and, therefore, adversely affect productivity of system users. Accordingly, there is a need for a more efficient technique for deploying antivirus applications on computer systems that would minimize their interference with activities of system users.

SUMMARY

Disclosed herein are systems, methods and computer program products that enable deployment of an antivirus application on a computer system in a manner that reduce interference of the antivirus application tasks with activities of system users. In one example embodiment, a computers system may be provided with a plurality of detection devices that may be used to detect when the computers system is being used by a user or when it is in downtime mode. The operation of these devices may be based on detection of various physical phenomena. The detection devices may include data input device, such as a mouse or keyboard, temperature sensors, pressure sensors, digital camera, sound wave source and sound wave receiver or other detection devices. The computer system may also include a software agent associated with an antivirus application. The software agent may collect and analyse data from various detection devices and determine if the computer system is being used by the user or is in the downtime mode. If software agent determines that computer system is in the downtime mode, it may launch various antivirus application tasks. The application may perform malware detection, scan system files, update malware definitions and detection algorithms and perform other tasks on the computer system. Since antivirus application is launched when computer system is in downtime, antivirus application does not interfere with activities of system users.

The above simplified summary of example embodiments of the invention serves to provide a basic understanding of the invention. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example embodiments of the invention and, together with the detailed description serve to explain the principles and implementations of the embodiments.

In the Drawings.

DETAILED DESCRIPTION OF EXAMPLE EMBODIMENTS

Example embodiments are described herein in the context of systems, methods and computer program products for launching of antivirus application tasks on a computer system during system downtime so as to minimize adverse effects of system resource utilization by the antivirus application on the activities of system users. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
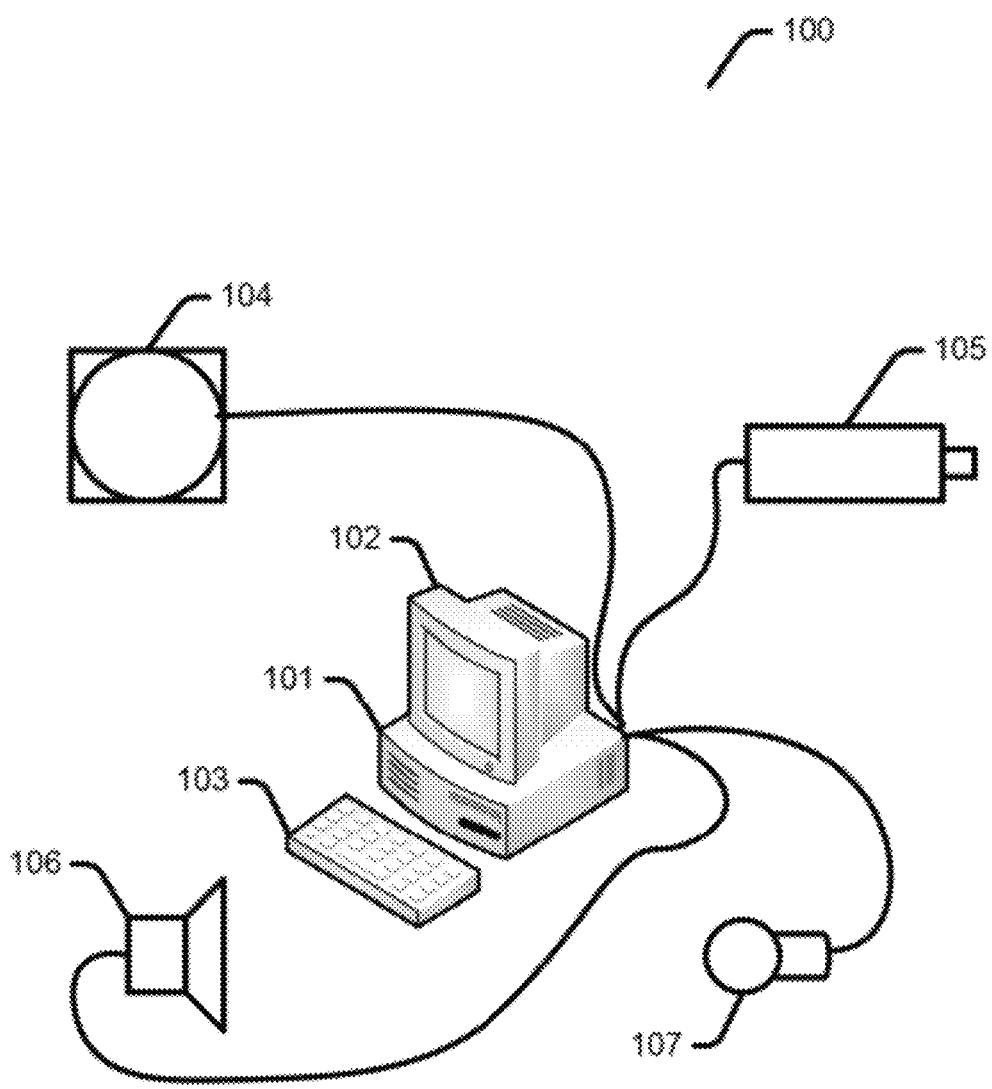
FIG. 1 illustrates a block diagram of a computer system for launching antivirus program tasks in accordance with one example embodiment.

FIG. 1 depicts an example embodiment of a computer system, such as a personal computer (PC) 100, which may be used to launch antivirus application tasks using techniques disclosed herein. It should be noted that in alternative embodiments, a workstation, a laptop computer, an application server or other type of computer system may be used to implement techniques disclosed herein. In one example embodiment, PC 100 includes a system unit 101 in which one or more processing and data storage components necessary for operation of the computer system 100 and execution of applications, including an antivirus application, are located. An antivirus application, such as an antivirus application 201d shown in FIG. 2, may be stored in an internal memory of system unit 101 in accordance with one embodiment. In another embodiment, an antivirus application may be stored on a remote computer system, such as a network application server, where it can be remotely accessed by the PC 100. PC 100 may also include a monitor 102 for displaying information to the user and a data input device 103, such as a keyboard and/or mouse, which allow the user to interact with the computer 100. A more detailed description of the PC 100 is provided herein below with reference to FIG. 4.

In one example embodiment, PC 100 includes one or more internal or external detector devices that may be used to detect if PC 100 is being used by the user or in a downtime mode, in which PC 100 is not used by the user. The operation of these devices may be based on detection of various physical phenomena. For example, a detector 104 may be an infrared temperature sensor operable to detect body heat of the system user when he is in the vicinity of PC 100. In another example, detector 104 may be an electromagnetic or piezoelectric pressure sensor capable of measuring the pressure exerted by the system user of the chair, table or floor next to PC 100. In another example, detector may include a digital camera 105 which monitors area around PC 100 to detect presence of a system user using facial recognition mechanisms. In another example, a sound wave source 106 and sound wave receiver 107 may be used to detect movement of a computer user in the vicinity of the PC 100. In particular, a sound wave of known amplitude and frequency may be emitted by sound wave source 106, reflected off of various objects and recorded by sound wave receiver 107. This detection method provides for a mechanism to analyze the reflected sound waves received by sound wave receiver 107. The frequency and amplitude of the sound wave and the Doppler shift, if any, are determined. Then, if there was a Doppler shift, it is most likely that a system user is near the PC 100.

In alternative embodiments, information input device 103, such as a keyboard and/or mouse, may be used to determine if PC 100 is being used by the user or if it is in a downtime mode. For example, the transfer of information from input device 103 to the PC 100, or more specifically to system unit 101, may be continuously or periodically monitored and if no information is transferred from the input device 103 for a specific period of time, a conclusion may be made that PC 100 is in downtime mode. Yet in other embodiments, information from the input device 103 may be combined with information from one or more detection devices 104, 105, 106 and 107 for a more reliable determination of the status of the PC 100.

Figure 2:
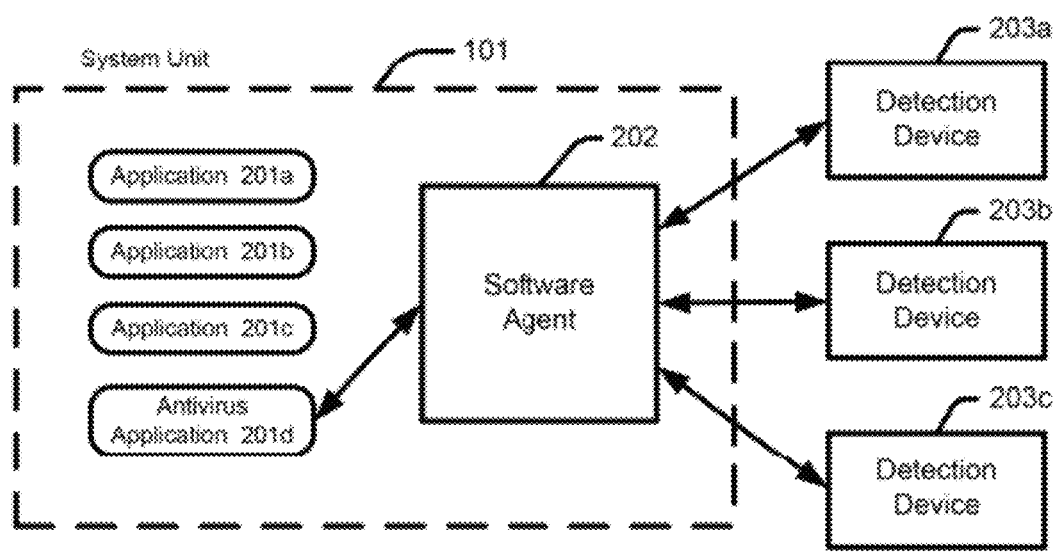
FIG. 2 illustrates a more detailed block diagram of a computer system for launching antivirus program tasks in accordance with one example embodiment.

As shown in FIG. 2, computers system 100 may also include a software agent 202 associated with the antivirus application 201d in accordance with one example embodiment. Software agent 202 may be stored in the memory of the PC 100, as shown in FIG. 2, or may be external to the computer system 100. Software agent 202 may be connected with detection devices 203 using serial ports/interfaces of PC 101 as will be explained in a greater detail herein below with reference to FIG. 4. As explained above, detection devices 203 may include, but not limited to, pressure sensor 104, camera 105, information input device 103, or the acoustic system, which includes sound wave source 106 and sound wave receiver 107. In one example embodiment, software agent 202 uses information collected from the detection devices 203 to determine if computer 100 is in downtime mode in order to launch antivirus application 201d.

Figure 3:
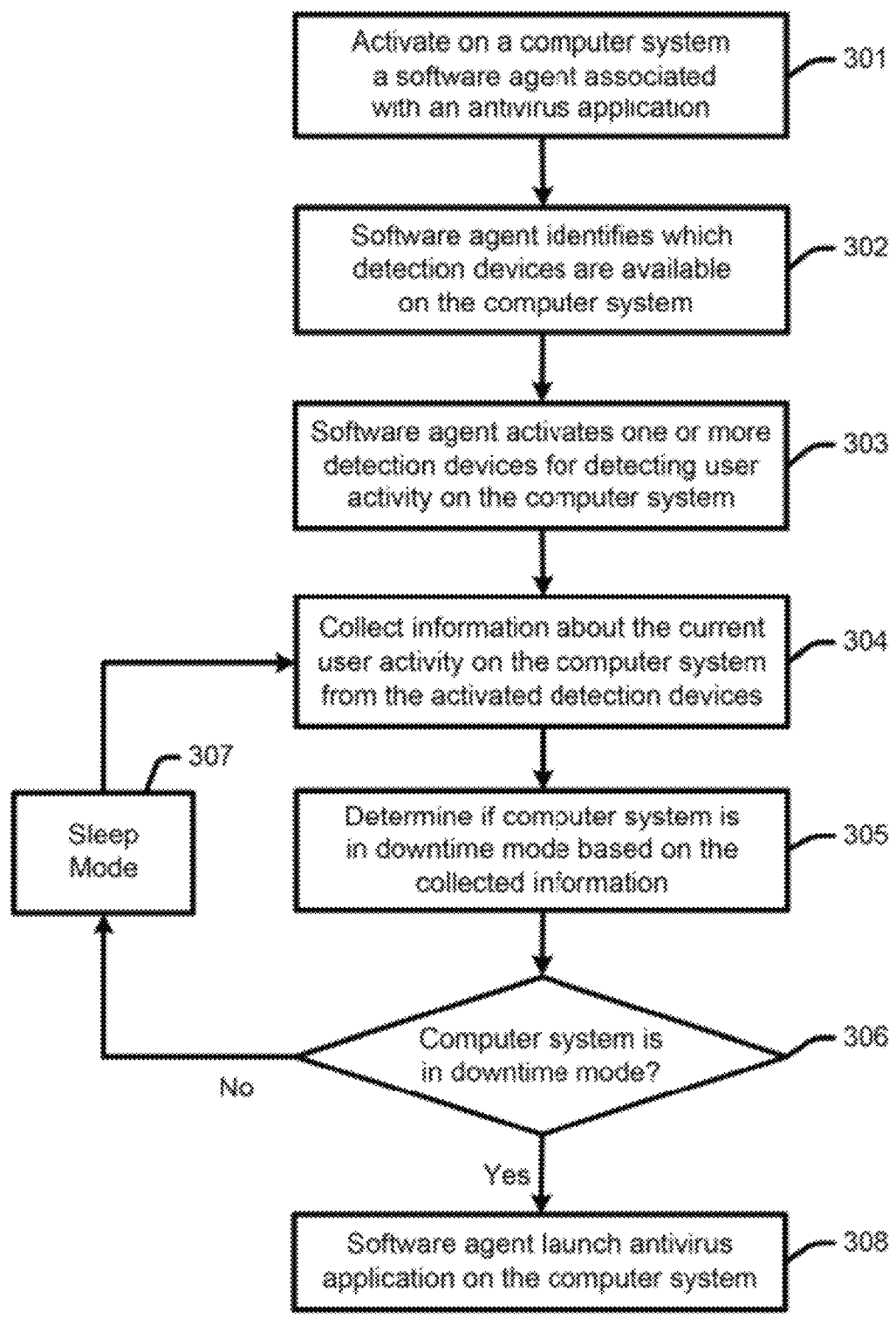
FIG. 3 illustrates an exemplary algorithm for launching antivirus program tasks during computer system downtime in accordance with one example embodiment.

FIG. 3 illustrates an example embodiment of a control algorithm that may be implemented in software agent 202. At step 301, software agent 202 is loaded, installed and activated on the computer system 100. At step 302, agent 202 identifies which detection device(s) 203 are available on PC 100. At step 303, software agent 202 may activate one or more identified detection devices 203 for detecting user activity on PC 100. At step 304, software agent 202 collects current user activity information from the detection device(s) 203. At step 305, software agent 202 analyzes the collected information to determine if PC 100 is being used by the user or is in the downtime mode. If, at step 306, software agent 202 determines that PC 100 is being used by the user, software agent may go into temporary sleep mode, at step 307, and resume collection of information from the detection devices, at step 304, after expiration of a predetermined period of time. If at step 306, software agent 202 determines that PC 100 is in downtime mode, software agent may launch, at step 308, antivirus application 201d. Antivirus application may perform malware detection, scan system files, update malware definitions and detection algorithms and perform other tasks on the computer system 100.

In the embodiment where detection device 203 is an input device 103, such as a keyboard, software agent 202 may be configured to detect user input via input device 103, which would indicate whether PC 100 is being used by the user or it is in downtime mode. When software agent 202 determines that PC 100 is in downtime mode for a certain period of time, e.g., 15 minutes, software agent 102 may launch various antivirus application tasks.

In the embodiment where detection device 203 is digital camera 105, software agent 202 may determine system downtime by identifying presence/absence of system user near the PC 100. In particular, software agent 102 can utilize facial recognition software to identify users face or other body parts and, then launch/stop antivirus application tasks when the system user is away or near the computer system 100 as described above.

In the embodiment where detection device 203 is a temperature sensor, software agent 202 would know the average temperature of a human body. In this way software agent 202 is able to determine user's presence near PC 100 by monitoring information from sensor 203 about the temperature of the space around computer system 100 and, launch/stop antivirus application tasks when the system user is away or near PC 100 as described above.

In the embodiment where detection device 203 is a pressure sensor, software agent 202 would know the difference in pressure on the chair or floor when a system user is seating/standing near PC 100 or away from the PC 100. In this way, software agent 202 is able to determine user's presence near PC 100 by analyzing information from the pressure sensor 203 about the pressure on the chair or floor around computer system 100 and, launch/stop antivirus application tasks when the system user is away or near PC 100 as described above.

In the embodiment where detection device 203 is sound wave source 106 and sound wave receiver 107, software agent 202 may be configured to determine the frequencies and amplitudes of the reflected signals reaching sound wave receiver 107. In particular, software agent 202 may compare the parameters of the outgoing and incoming signal and the Doppler shift, if any, and on the basis of this data determine if system user is near PC 100 and launch/stop antivirus application tasks when the system user is away or near PC 100 as described above.

In another embodiment, software agent 202 may utilize other resource or applications provided by PC 100 to determine if computer system is in downtime mode. For example, software agent 202 may check if a screen saver application has been activated on PC 100 by its operating system, which would indicate that PC 100 is in downtime mode and antivirus application 201d can be safely launched without interfering with activities of system user.

In one example embodiment, software agent 202 may continue monitoring the state of detection devices 203 described above during execution of the antivirus application 201d. If user presence is detected via the detection device 203, software agent 202 may temporary suspend execution of one or all tasks of the antivirus application while computer 100 is being used by the user. The state of the suspended tasks may be stored by the software agent 202 or application 201d, so that these tasks can be resumed from the point where they were stopped once PC 100 enters the downtime mode again. In one example embodiment, software agent 202 may suspend execution of only the most resource intensive tasks of the antivirus application 201d that would interfere most with current activities of the user. For example, software agent 202 may suspend malware scan of the system's hard disk drive while the user accesses documents or applications stored on the hard drive. At the same time, software agent may allow application 201d to continue updating its local antivirus databases on PC 100 from a remote network server because system user is not currently accessing network through PC 100, so that use of network by the antivirus application 201d would not interfere with current user activities. Once software agent 202 detects via detection device 203 that user input has been terminated, it may resume execution of all antivirus application tasks from the point where they were stopped.

In one example embodiment, software agent 202 may be configured to monitor and record user activity on PC 100 for a period of time, e.g., a week, based on information collected from one or more detection devices 203. Software agent 202 may analyze the collected data and generate a record of all time periods during which PC 100 has been in downtime mode. This long-term PC status information may be forwarded to the antivirus application 201d. Using the received information, antivirus application 201d may identify when PC 100 is expected to be in downtime mode and automatically schedule various tasks on PC 100 for that period. This schedule may be adjusted to accommodate changes in user activities on PC 100. For example, if a scheduled task conflicts with the ongoing user activity, the antivirus application 201d may postpone the given task until PC 100 enters downtime mode and updates schedule accordingly.

Figure 4:
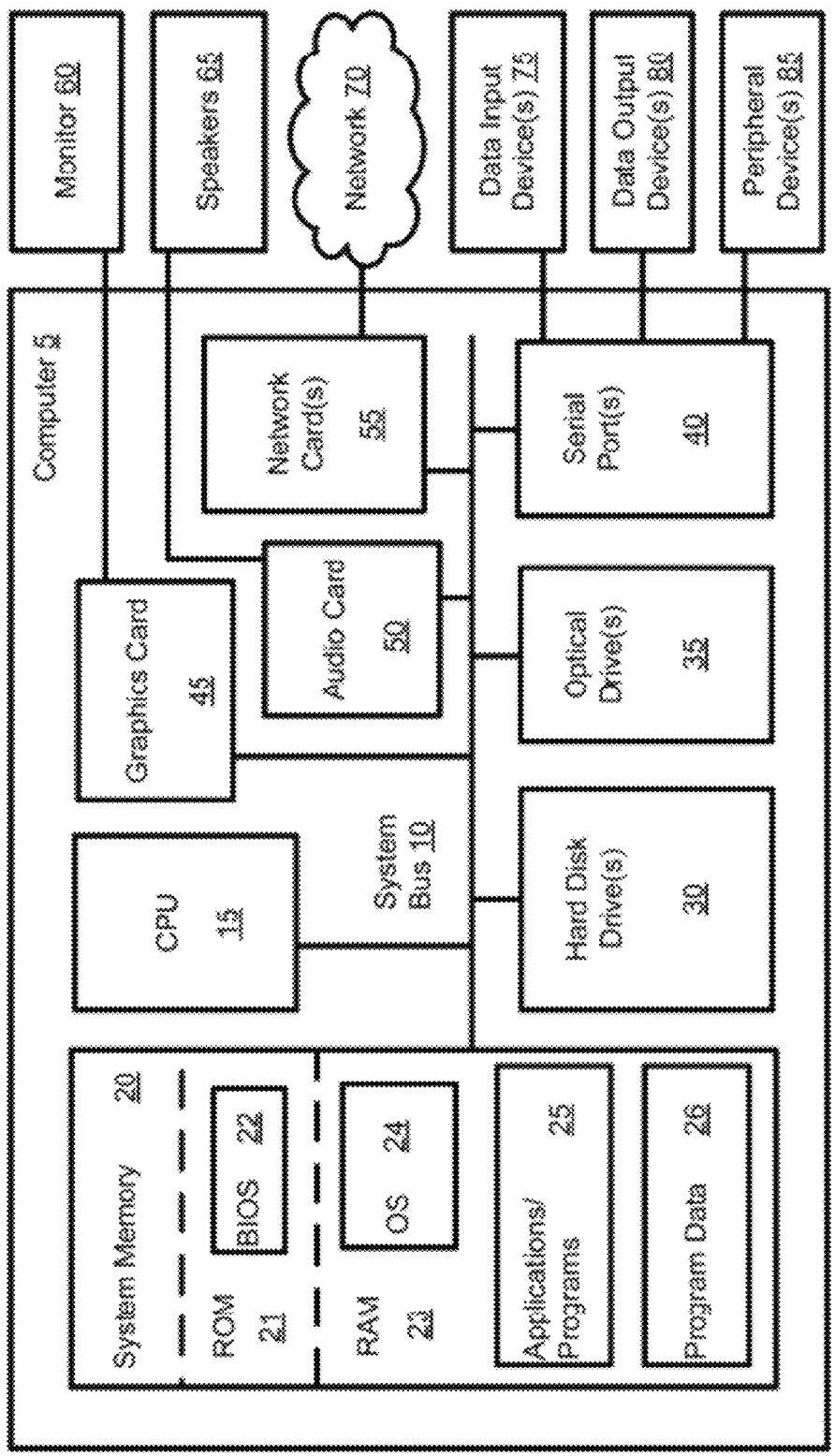
FIG. 4 illustrates a schematic block diagram of a computer system in accordance with one example embodiment.

FIG. 4 depicts an exemplary computer system 5, which can be used to implement PC 100, in accordance with one example embodiment. It should be noted that computer system 5 may also be used to implement a desktop computer, a workstation, a laptop computer, an application server or other type of data processing device. As depicted, computer system 5 includes CPU 15, system memory 20, hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include Intel® Core 2 Quad 2.33 GHz processor or other type of microprocessor.

System memory 20 includes a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during startup. RAM 23 stores operating system 24 (OS), such as Windows® Vista® or other type of OS, that is responsible for management and coordination of processes and allocation and sharing of hardware resources in computer system 5. System memory 20 also stores applications and programs 25 that are currently running on the computer 5, including antivirus application 201d and various other programs. System memory 20 also stores various runtime data 26 used by the applications and programs 25.

Computer system 5 may further include hard disk drive(s) 30, such as 500 GB SATA magnetic hard drive, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as various detection devices 203 described herein. Computer system 5 may also include graphics card 45, such as nVidia® GeForce® GT 240M or other video card, for interfacing with a monitor 60 or other video reproduction device. Computer system 5 may also include an audio card 50 for reproducing sound via internal or external speakers 65. In addition, computer system 5 may include network card(s) 55, such as Ethernet, WiFi, GSM, Bluetooth or other wired, wireless, or cellular network interface for connecting computer system 5 to network 70, such as the Internet.

As used in this application, the terms "system," "component," "agent" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various non-transitory computer-readable medium having various data structures stored thereon. The components may communicate by way of local and/or remote processes such as in accordance with a signal having one or more data packets, such as data from one component interacting with another component in a local system and/or across a network, such as the Internet with other systems.

In various embodiments, the algorithms and methods described herein may be implemented in hardware, software, firmware, or any combination thereof. If implemented in software, the functions may be stored or transmitted as one or more instructions or code on a non-transitory computer-readable medium. Computer-readable media includes both computer storage media and communication media including any medium that facilitates transfer of a computer program from one place to another. A storage medium may be any available media that can be accessed by a computer. By way of example, and not limitation such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted'pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray®) disc where disks usually reproduce data magnetically, while discs usually reproduce data optically with lasers. Combinations of the above should also be included within the scope of computer-readable media.

In the interest of clarity, not all of the routine features of the implementations described herein are shown and described. It will be appreciated that in the development of any such actual implementation, numerous implementation-specific decisions must be made in order to achieve the developer's specific goals, such as compliance with application-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A method for launching an antivirus application on a computer system, the method comprises:
    activating on the computer system a software agent associated with the antivirus application;
    identifying by the software agent one or more user detection devices associated with the computer system;
    collecting information from the one or more identified user detection devices about user activities at the computer system including presence of a user at the computer system;
    determining if the computer system is in a downtime mode based on the collected information;
    launching one or more tasks of the antivirus application if computer system is in downtime mode;
    continue collecting information from the one or more user detection devices during execution of one or more tasks of the antivirus application;
    determining if the computer system is no longer in the downtime mode based on the collected information about one or more user activities on the computer system;
    temporary suspending execution of one or more tasks of the antivirus application that interfere with the detected user activities; and
    continuing executing one or more tasks of the antivirus application that do not interfere with the detected user activities.

2. The method of claim 1, wherein a user detection device includes a pressure sensor coupled to the computer system for detecting presence of a user near the computer system using pressure measurements.

3. The method of claim 1, wherein a user detection device includes a temperature sensor coupled to the computer system for detecting presence of a user near the computer system using temperature measurements.

4. The method of claim 1, wherein a user detection device includes an acoustic sensor coupled to the computer system for detecting presences of a user near the computer system using acoustic measurements.

5. The method of claim 1 further comprises:
    generating a system downtime schedule based on information collected for a long-term period from the one or more user detection devices.

6. The method of claim 5 further comprises:
    automatically scheduling one or more antivirus application tasks on the computer system based on the generated long-term system downtime schedule.

7. A system for launching an antivirus application, the system comprises:
    a memory for storing an antivirus application and an associated software agent;
    a processor for executing one or more antivirus application tasks; and
    one or more user detection devices operably coupled to the processor, wherein the processor being configured to:
        activate the software agent associated with the antivirus application;
        identify one or more user detection devices;
        collect information from the one or more identified user detection devices about user activities including presence of a user;
        determine if the system is in a downtime mode based on the collected information;
        launch one or more antivirus application tasks if system is in downtime mode;
        continue collect information from the one or more user detection devices during execution of one or more tasks of the antivirus application;
        determine if the system is no longer in the downtime mode based on the collected information about one or more user activities on the system;
        temporary suspend execution of one or more tasks of the antivirus application that interfere with the detected user activities; and
        continue execute one or more tasks of the antivirus application that do not interfere with the detected user activities.

8. The system of claim 7, wherein a user detection device includes a pressure sensor coupled to the system for detecting presence of a user near the system using pressure measurements.

9. The system of claim 7, wherein a user detection device includes a temperature sensor coupled to the system for detecting presence of a user near the system using temperature measurements.

10. The system of claim 7, wherein a user detection device includes an acoustic sensor coupled to the system for detecting presences of a user near the system using acoustic measurements.

11. The system of claim 7, wherein the processor being further configured to:
generate a system downtime schedule based on information collected for a long-term period from the one or more user detection devices.

12. The system of claim 11, wherein the processor being further configured to:
automatically schedule one or more antivirus application tasks on the system based on the generated long-term system downtime schedule.

13. The system of claim 7, wherein a user detection device include a camera coupled to the system for detecting presences of a user near the system.

14. A computer program product in a non-transitory computer-readable storage medium, the computer program product comprising computer-executable instructions for launching an antivirus application on a computer system, including instructions for:
activating on the computer system a software agent associated with the antivirus application;
identifying by the software agent one or more user detection devices associated with the computer system;
collecting information from the one or more identified user detection devices about user activities at the computer system including presence of a user at the computer system;
determining if the computer system is in a downtime mode based on the collected information;
launching one or more tasks of the antivirus application if computer system is in downtime mode;
continue collecting information from the one or more user detection devices during execution of one or more tasks of the antivirus application;
determining if the computer system is no longer in the downtime mode based on the collected information about one or more user activities on the computer system;
temporary suspending execution of one or more tasks of the antivirus application that interfere with the detected user activities; and
continuing executing one or more tasks of the antivirus application that do not interfere with the detected user activities.

15. The product of claim 14, wherein a user detection device includes a pressure sensor coupled to the computer system for detecting presence of a user near the computer system using pressure measurements.

16. The product of claim 14, wherein a user detection device includes a temperature sensor coupled to the computer system for detecting presence of a user near the computer system using temperature measurements.

17. The product of claim 14, wherein a user detection device includes an acoustic sensor coupled to the computer system for detecting presences of a user near the computer system using acoustic measurements.

18. The product of claim 14 further comprises:
instructions for generating a system downtime schedule based on information collected for a long-term period from the one or more user detection devices.

19. The product of claim 18 further comprises:
instructions for automatically scheduling one or more antivirus application tasks on the computer system based on the generated long-term system downtime schedule.

20. The product of claim 14, wherein a user detection device includes a camera coupled to the system for detecting presences of a user near the system.

* * * * *